United States Patent
Lin et al.

(10) Patent No.: US 9,515,544 B2
(45) Date of Patent: Dec. 6, 2016

(54) VOLTAGE COMPENSATION CIRCUIT AND CONTROL METHOD THEREOF

(71) Applicant: INDUSTRIAL TECHNOLOGY RESEARCH INSTITUTE, Hsinchu (TW)

(72) Inventors: Keng-Yu Lin, Taichung (TW); Wei-Xiang Tang, Kaohsiung (TW); Po-Han Huang, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 464 days.

(21) Appl. No.: 14/161,516

(22) Filed: Jan. 22, 2014

(65) Prior Publication Data

US 2015/0108963 A1    Apr. 23, 2015

(30) Foreign Application Priority Data

Oct. 23, 2013 (TW) .............................. 102138324 A

(51) Int. Cl.
*H02J 1/00* (2006.01)
*H02M 1/08* (2006.01)
(Continued)

(52) U.S. Cl.
CPC .................. *H02M 1/08* (2013.01); *G05F 1/46* (2013.01); *H02J 1/00* (2013.01); *H02M 3/07* (2013.01)

(58) Field of Classification Search
CPC .............. H02M 1/08; H02M 3/07; G05F 1/46; H02J 1/00
(Continued)

(56) References Cited

U.S. PATENT DOCUMENTS 7,135,842 B2    11/2006   Banerjee et al.
7,541,696 B2 *  6/2009    Dawley .................... H02J 3/12
                                                        307/103
(Continued)

FOREIGN PATENT DOCUMENTS

TW    M300392        11/2006
TW    I328157 B       8/2010
(Continued)

OTHER PUBLICATIONS

Sofer, S. et al., Active System for Compensation for IR Drops, IEEE International Conference on Microwaves, Antennas and Electronic Systems, May 13-14, 2008, pp. 1-6.
(Continued)

*Primary Examiner* — Hal Kaplan
(74) *Attorney, Agent, or Firm* — Muncy, Geissler, Olds & Lowe, P.C.

(57) ABSTRACT

A voltage compensation circuit and a control method thereof dynamically compensate a voltage drop caused by supplying power from a first power line to a function circuit. The voltage compensation circuit includes an amplifier, a detection module and a boosting module. The amplifier has an inverting input end coupled to the first power line and the function circuit to be supplied with a load voltage supplying to the function circuit, a non-inverting input end for being supplied with a reference voltage, and an output end coupled to the detection module to output a comparison signal. The boosting module is coupled between the detection module and the inverting input end of the amplifier. The detection module generates compensation voltage information according to the comparison signal. The boosting module outputs the compensation voltage to the inverting input end of the amplifier according to the compensation voltage information.

16 Claims, 6 Drawing Sheets

(51) Int. Cl.
*G05F 1/46* (2006.01)
*H02M 3/07* (2006.01)

(58) Field of Classification Search
USPC .......................................................... 307/103
See application file for complete search history.

(56) References Cited

U.S. PATENT DOCUMENTS

| | | | |
|---|---|---|---|
| 7,714,559 B2* | 5/2010 | You ...................... | H02M 3/156 |
| | | | 323/271 |
| 7,895,454 B2 | 2/2011 | Singh | |
| 7,956,651 B2 | 6/2011 | Ptacek et al. | |
| 8,143,845 B2 | 3/2012 | Choi | |
| 8,354,820 B2* | 1/2013 | Liu ........................... | G05F 1/67 |
| | | | 320/101 |
| 8,370,654 B1 | 2/2013 | Hasko et al. | |
| 8,390,242 B2* | 3/2013 | Liu ........................... | G05F 1/67 |
| | | | 320/101 |
| 8,976,559 B2* | 3/2015 | Shen ................ | H02M 3/33507 |
| | | | 363/21.16 |
| 9,078,321 B2* | 7/2015 | Sun .................... | H05B 33/0824 |
| 2011/0101937 A1 | 5/2011 | Dobkin et al. | |
| 2011/0221405 A1 | 9/2011 | Tang et al. | |
| 2012/0310063 A1 | 12/2012 | Wang et al. | |

FOREIGN PATENT DOCUMENTS

| | | |
|---|---|---|
| TW | I331264 B | 10/2010 |
| TW | M389822 | 10/2010 |
| TW | M417582 | 12/2011 |
| TW | 201312911 A | 3/2013 |
| TW | 201314403 A | 4/2013 |

OTHER PUBLICATIONS

Dubey, Aishwarya, P/G Pad Placement Optimization: Problem Formulation for Best IR Drop, Sixth International Symposium on Quality Electronic Design, Mar. 21-23, 2005, pp. 340-345.

Leung, Kwok-Shing, SPIDER: Simultaneous Post-Layout IR-Drop and Metal Density Enhancement with Redundant Fill, IEEE/ACM International Conference on Computer-Aided Design, Nov. 6-10, 2005, pp. 33-38.

Chen, Hsien-Te et al., Reconfigurable ECO Cells for Timing Closure and IR Drop Minimization, IEEE Transactions on Very Large Scale Integration (VLSI) Systems, Dec. 2010, pp. 1686-1695, vol. 18, No. 12.

Genser, Andreas et al., Supply Voltage Emulation Platform for DVFS Voltage Drop Compensation Explorations, 2011 IEEE International Symposium on Performance Analysis of Systems and Software, Apr. 10-12, 2011, pp. 129-130.

Vasantha Kumar B.V.P. et al., Variable Input Delay CMOS logic for Dynamic IR Drop Reduction, 2012 Asia Pacific Conference on Postgraduate Research in Microelectronics & Electroncis (PRIMEASIA), Dec. 5-7, 2012, pp. 79-84.

* cited by examiner

VOLTAGE COMPENSATION CIRCUIT AND CONTROL METHOD THEREOF

CROSS-REFERENCE TO RELATED APPLICATIONS

This non-provisional application claims priority under 35 U.S.C. §119(a) on Patent Application No(s). 102138324 filed in Taiwan, R.O.C. on Oct. 23, 2013, the entire contents of which are hereby incorporated by reference.

TECHNICAL FIELD

The disclosure relates to a voltage compensation circuit and a control method thereof.

BACKGROUND

In the integrated circuit (IC), i.e. chip, fabrication technique, the working voltage of function circuits in a chip has become lower than before, that is, nowadays chips have lower capacity for bearing noises than before. Furthermore, the area of electronic component has also become smaller. Therefore, a quantity of function circuits disposed in a chip has increased, which requires higher current density. On the other hand, a three dimensional integrated circuit (3DIC), i.e. 3D chip has been developed to allow more function circuits to be arranged within different layers. Because of arranging these function circuits within different layers, the distance between power lines in the 3D chip will become longer than that in a 2D chip (2DIC), resulting in higher resistance effect which causes relative voltage drop when a power line powers a function circuit.

Generally, it may increase the decoupling capacitance value of the function circuit or use a power layout design in the layout of chip to compensate such a power drop. However, the power layout design may have the voltage attenuation effect caused by different loads of the function circuit in different working conditions, and the means of increasing the decoupling capacitance value in the function circuit may use an unsuitable capacitance because of considering the suitable response time of the function circuit.

SUMMARY

According to an embodiment, a voltage compensation circuit is adapted to dynamically compensate a voltage drop caused by supplying power from a first power line to a function circuit coupled between the first power line and a second power line. The voltage compensation circuit includes a first amplifier, a detection module and a boosting module. The first amplifier has an inverting input end coupled to the first power line and the function circuit to be supplied with a load voltage, and a non-inverting input end for being supplied with a reference voltage. The detection module is coupled between to an output end of the first amplifier and the boosting module. The boosting module is coupled between the detection module and the inverting input end of the first amplifier. The first amplifier compares the load voltage and the reference voltage to generate a first comparison signal. The detection module generates compensation voltage information according to the first comparison signal. The boosting module generate the compensation voltage according to the compensation voltage information and supplies the compensation voltage to the inverting input end of the first amplifier, so as to control the input of the function circuit to be equal to a combination of the load voltage and the compensation voltage.

According to an embodiment, a control method of a voltage compensation circuit coupled to a node where a first power line and a function circuit join is performed to dynamically compensate a voltage drop caused by supplying power from the first power line to the function circuit coupled between the first power line and a second power line. The control method includes steps of comparing a load voltage and a reference voltage to generate a first comparison signal, of generating compensation voltage information according to the first comparison signal, of generating a compensation voltage according to the compensation voltage information, and of supplying the compensation voltage to the node, so as to control the input of the function circuit to be equal to a combination of the load voltage and the compensation voltage. The load voltage is supplied from the first power line to the function circuit.

BRIEF DESCRIPTION OF THE DRAWINGS

The present disclosure will become more fully understood from the detailed description given herein below for illustration only and thus does not limit the present disclosure, wherein.

DETAILED DESCRIPTION

Figure 1:
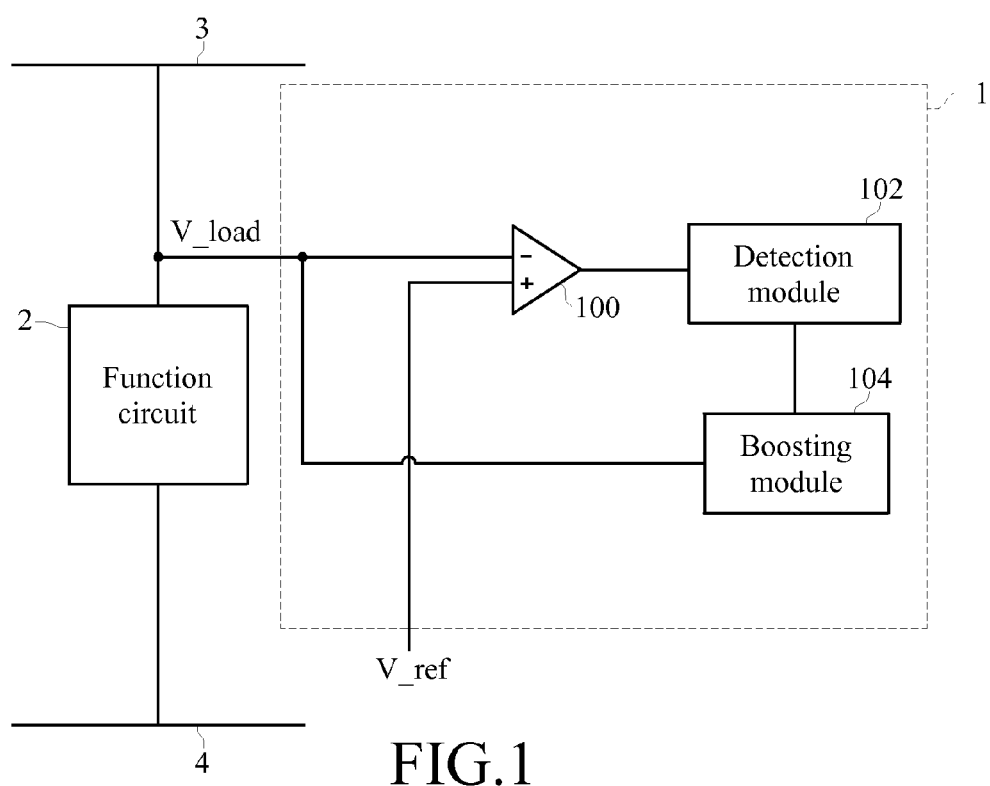
FIG. 1 is a block diagram of a voltage compensation circuit according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a block diagram of a voltage compensation circuit 1 according to an embodiment of the disclosure. The voltage compensation circuit 1 is adapted to dynamically compensate a voltage drop, i.e. IR drop, caused by supplying power from a first power line 3 to a function circuit 2 coupled between the first power line 3 and a second power line 4. The voltage compensation circuit 1 mainly includes a first amplifier 100, a detection module 102 and a boosting module 104. In an exemplary embodiment, the first power line 3 and the second power line 4 are a power wire and a ground wire respectively. These modules or elements in the voltage compensation circuit 1 will be described below.

The first amplifier 100 has an inverting input end coupled to the first power line 3 and the function circuit 2 to be supplied with a load voltage V_load, a non-inverting input end for being supplied with a reference voltage V_ref, and an output end for outputting a first comparison signal generated by comparing the load voltage V_load with the reference voltage V_ref. In other words, the first amplifier 100 can amplify the decayed load voltage V_load caused by the voltage drop to be at a suitable potential that the detection module 102 can detect. As an example and not by way of limitation, the first amplifier 100 can be an error amplifier for amplifying a difference between the load voltage V_load and the reference voltage V_ref to generate the first comparison signal. As another example and not by way of limitation, the first amplifier 100 can be a variable gain amplifier (VGA). In the disclosure, the load voltage V_load is the voltage on the first power line 3 and is supplied from the first power line 3 to the function circuit 2, and the reference voltage V_ref is constant, so that the first amplifier 100 can, by using the comparison result of the reference voltage V_ref and the load voltage V_load, determine whether the voltage drop occurs in the load voltage V_load.

The detection module 102 is coupled to the output end of the first amplifier 100 and the boosting module 104. The detection module 102 generates compensation voltage information according to the first comparison signal outputted by the first amplifier 100 and outputs the compensation voltage information. As an example and not by way of limitation, the detection module 102 can be an analog to digital conversion (ADC) or an error pulse generator.

The boosting module 104 is coupled to the detection module 102 and the inverting input end of the first amplifier 100. The boosting module 104 generates a compensation voltage according to the compensation voltage information outputted by the detection module 102 and supplies the compensation voltage to the inverting input end of the first amplifier 100, so as to control the input of the function circuit 2 to be equal to a combination of the load voltage V_load and the compensation voltage. In other words, the compensation voltage is equal to the voltage lose caused by the voltage drop when the first power line 3 powers the function circuit 2, so as to maintain the input of the function circuit 2 to at a preset potential. As an example and not by way of limitation, the boosting module 104 can be a booster.

Accordingly, the voltage compensation circuit 1 can be considered as a voltage regulator circuit for dynamically compensating the voltage drop caused by supplying power from the first power line 3 to the function circuit 2, so as to maintain the input of the function circuit 2 to be at the preset potential, thereby increasing the efficiency of the function circuit 2. In particular embodiments, the voltage compensation circuit 1 can be applicable to a chip having lower capacity for bearing the voltage attenuation and will be described below.

Figure 2A:
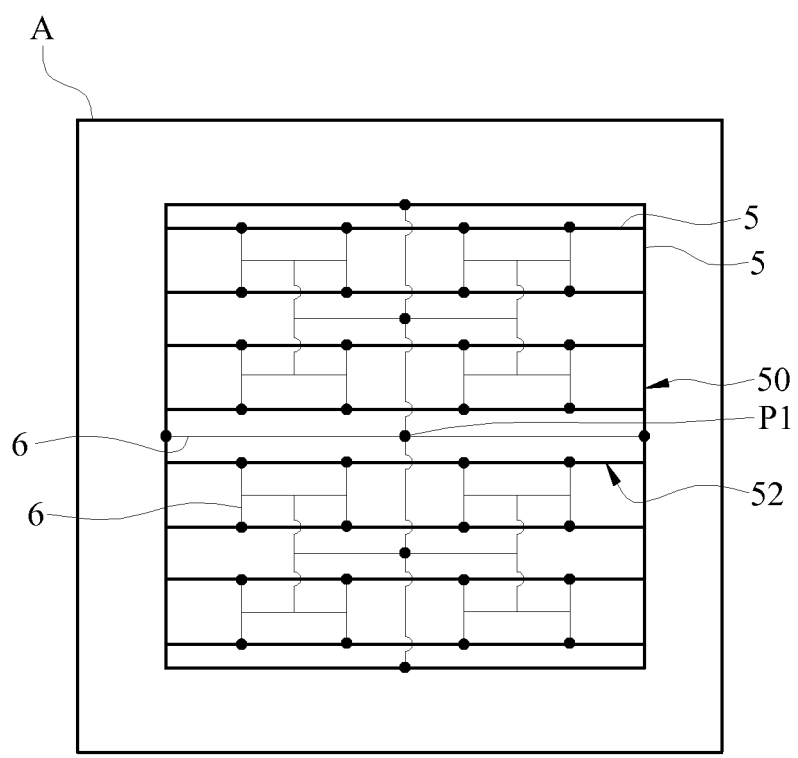
FIG. 2A is a schematic diagram of a power layout of a chip in which the voltage compensation circuit in FIG. 1 is implemented according to an embodiment of the disclosure.

In an exemplary embodiment, FIG. 2A is a schematic diagram of a power layout of a chip A in which the voltage compensation circuit 1 in FIG. 1 is implemented. This chip A is a simplified model for schematically showing the basic structure of a chip and the layout of first power lines and should not limit the disclosure, and the shape, size, arrangement and content of the chip A can be designed according to particular requirements.

The chip A includes multiple function circuits 2 (not shown in FIG. 2A), multiple first conductive wires 5 and multiple second conductive wires 6. Four of these first conductive wires 5 are joined to form a power ring 50, and the other first conductive wires 5 are substantially paralleled and coupled to two opposite first conductive wires 5 of the power ring 50 in parallel, so as to form a power mesh 52 in which the first conductive wire 5 is the first power line 3 in FIG. 1. Moreover, the chip A further includes one or more ground rings (not shown), where a second power line in the ground ring is the second power line 4 in FIG. 1. Two of the second conductive wires 6 are coupled to the power ring 50 and are perpendicular to each other to form an intersection P1 at the center of the power ring 50, and the other second conductive wires 6 are symmetrically coupled to the other first conductive wires 5 of the power ring 50 (i.e. the first conductive wires 5 of the power mesh 52) around the intersection P1. Thus, the voltage on the second conductive wires 6 may substantially be the voltage on the power ring 50 and can serve as the above reference voltage V_ref.

Specifically, these second conductive wires 6 are around the intersection P1 and symmetrically coupled to the other first conductive wires 5 in the power ring 50, so as to form a power tree in which the current paths between each node where the second conductive wire 6 and the first conductive wire 5 are coupled, and a node where the power ring 50 and the second conductive wire 6 which forms the intersection P1 are coupled, are the same. Thus, the voltage anywhere in the power tree is constant and can serve as the reference voltage V_ref. As an example and not by way of limitation, any one of tips of the power tree (i.e. each node where the second conductive wire 6 and the first conductive wire 5 are coupled) is coupled to the non-inverting input end of the first amplifier 100.

In FIG. 2A, the second conductive wires 6 across the power mesh 52 do not contact with the first conductive wires 5. Moreover, the first conductive wires 5 and the second conductive wires 6 are drawn with thick lines and thin lines respectively in order to distinguish the first conductive wires 5 from the second conductive wires 6, and the first conductive wires 5 and the second conductive wires 6 can be any suitable conductive wires.

Figure 2B:
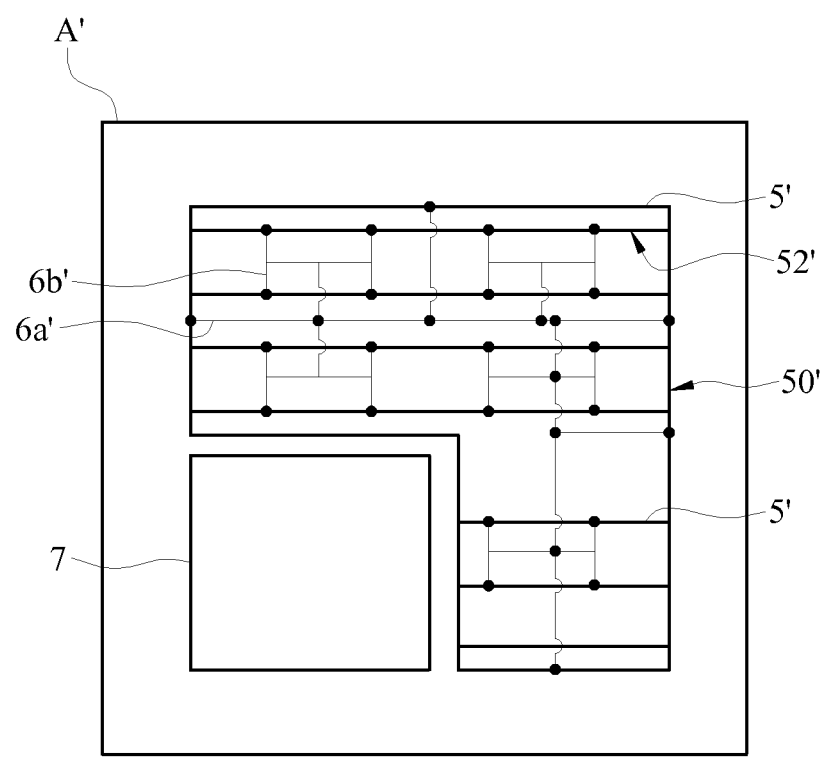
FIG. 2B is a schematic diagram of a power layout of a chip in which the voltage compensation circuit in FIG. 1 is implemented according to an embodiment of the disclosure.

In another exemplary embodiment, FIG. 2B is a schematic diagram of a power layout of a chip A' in which the voltage compensation circuit 1 in FIG. 1 is implemented. As an example and not by way of limitation, the chip A' can be a system on a chip (SoC) and include one or more circuit layouts. The chip A' is a simplified model for schematically showing the basic structure of a chip and the layout of first power lines, and the shape, size, arrangement and content of the chip A' can be designed according to particular requirements.

The chip A' includes multiple first conductive wires 5', multiple second conductive wires 6a' and 6b' and a circuit unit 7. As an example and not by way of limitation, the circuit unit 7 can include one or more voltage compensation circuits 1, one or more function circuits 2 or other suitable circuits. Six of the first conductive wires 5' are coupled to form a polygon power circle 50', and the other first conductive wires 5' are substantially paralleled and disposed in the power ring 50', so as to form a power mesh 52'. At least one of two ends of each second conductive wire 6a' is coupled to the power ring 50' to form a backbone in the circuitry layout. The second conductive wires 6b' forms H-shape power layouts coupled to the power mesh 52', and each H-shape power layout is coupled to the backbone.

In FIG. 2B, the backbone do not contact with the first conductive wires 5'. Moreover, the first conductive wires 5' and the second conductive wires 6a' and 6b' are drawn with thick lines and thin lines respectively in order to distinguish the first conductive wires 5' from the second conductive wires 6a' and 6b', and the first conductive wires 5' and the second conductive wires 6a' and 6b' can be any suitable conductive wires.

Figure 3:
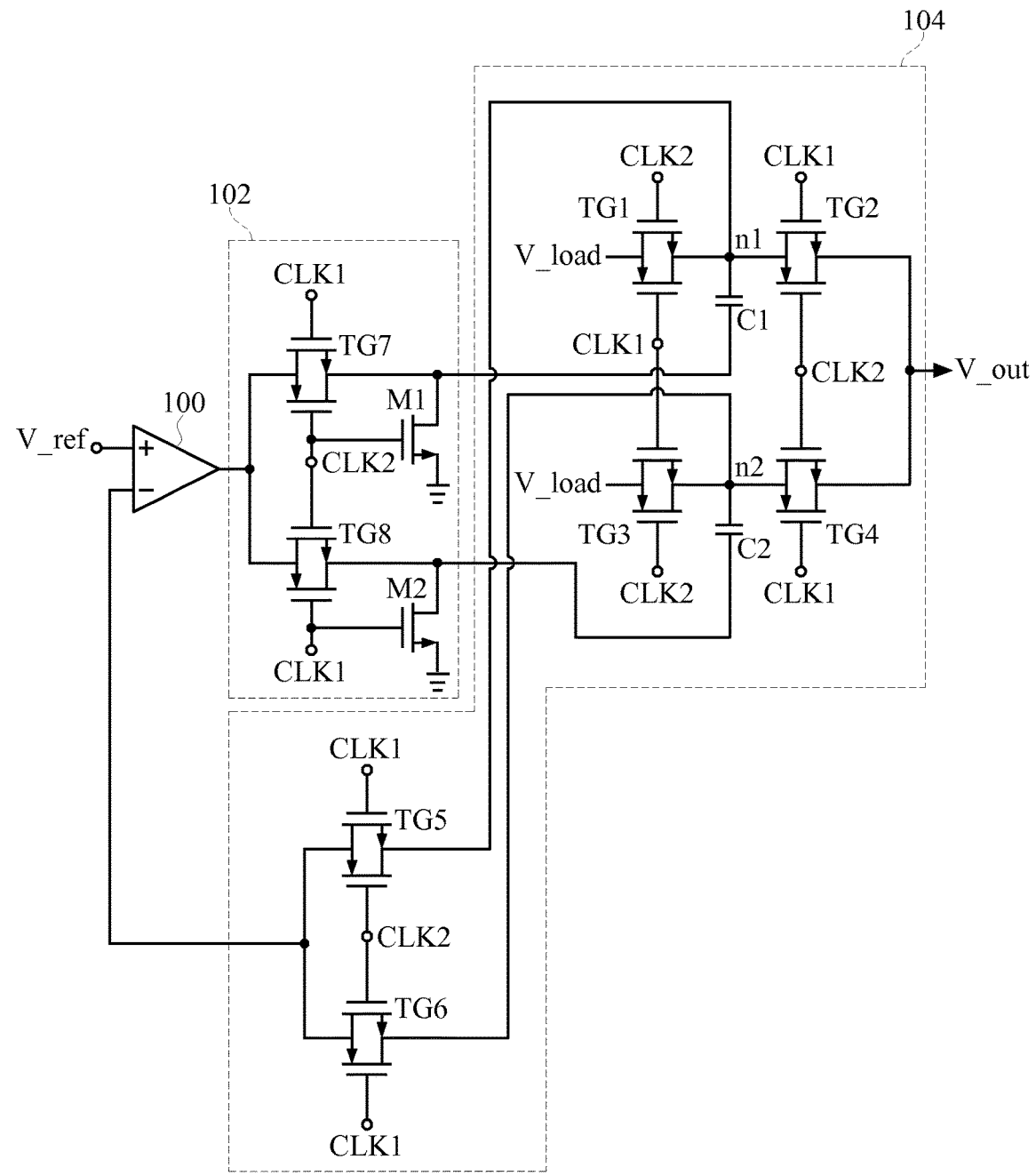
FIG. 3 is a circuitry of the voltage compensation circuit in FIG. 1 according to an embodiment of the disclosure.

FIG. 3 is a circuitry of the voltage compensation circuit 1 in FIG. 1 according to an embodiment of the disclosure. As an example and not by way of limitation, the first amplifier 100 is an error amplifier, the detection module 102 includes two error pulse generators, and the boosting module 104 includes two boosters.

The boosting module 104 includes a first capacitor C1, a second capacitor C2 and multiple transmission gates such as a first transmission gate TG1, a second transmission gate TG2, a third transmission gate TG3, a fourth transmission gate TG4, a fifth transmission gate TG5 and a sixth transmission gate TG6.

The input end of the first transmission gate TG1 is coupled to the first power line 3 for being supplied with the load voltage V_load, and the output end of the first transmission gate TG1 is coupled to the input end of the second transmission gate TG2 at a node n1 to which the one end of the first capacitor C1 is coupled to. The first transmission gate TG1 includes an N type transistor whose control end receives a first clock signal CLK1, and a P type transistor whose control end receives a second clock signal CLK2. The output end of the second transmission gate TG2 is coupled to the function circuit 2, and the second transmission gate TG2 includes an N type transistor whose control end receives the second clock signal CLK2, and a P type transistor whose control end receives the first clock signal CLK1. The input end of the third transmission gate TG3 is coupled to the first power line 3 for being supplied with the load voltage V_load, and the output end of the third transmission gate TG3 is coupled to the input end of the fourth transmission gate TG4 at a node n2 to which the one end of the second capacitor C2 is coupled. The third transmission gate TG3 includes an N type transistor whose control end receives the second clock signal CLK2, and a P type transistor whose control end receives a first clock signal CLK1. The output end of the fourth transmission gate TG4 is coupled to the function circuit 2, and the fourth transmission gate TG4 includes an N type transistor whose control end receives the first clock signal CLK1, and a P type transistor whose control end receives the second clock signal CLK2. The input end of the fifth transmission gate TG5 is coupled to the node n1, and the output end of the fifth transmission gate TG5 is coupled to the inverting input end of the first amplifier 100. The fifth transmission gate TG5 includes an N type transistor whose control end receives the second clock signal CLK2, and a P type transistor whose control end receives the first clock signal CLK1. The input end of the sixth transmission gate TG6 is coupled to the node n2, and the output end of the sixth transmission gate TG6 is coupled to the inverting input end of the first amplifier 100. The sixth transmission gate TG6 includes an N type transistor whose control end receives the first clock signal CLK1, and a P type transistor whose control end receives the second clock signal CLK2.

The detection module 102 includes a seventh transmission gate TG7, an eighth transmission gate TG8, a first transistor M1 and a second transistor M2. The input end of the seventh transmission gate TG7 is coupled to the output end of the first amplifier 100, and the output end of the seventh transmission gate TG7 is coupled to the other end of the first capacitor C1. The seventh transmission gate TG7 includes an N type transistor whose control end receives the second clock signal CLK2, and a P type transistor whose control end receives the first clock signal CLK1. The drain end of the first transistor M1 is coupled to the output end of the seventh transmission gate TG7, the gate end of the first transistor M1 couples to the control end of the N type transistor of the seventh transmission gate TG7 to receive the second clock signal CLK2, and the source end of the first transistor M1 is grounded (i.e. coupled to the second power line 4). The input end of the eighth transmission gate TG8 is coupled to the output end of the first amplifier 100, and the output end of the eighth transmission gate TG8 is coupled to the other end of the second capacitor C2. The eighth transmission gate TG8 includes an N type transistor whose control end receives the first clock signal CLK1, and a P type transistor whose control end receives the second clock signal CLK2. The drain end of the second transistor M2 is coupled to the output end of the eighth transmission gate TG8 and the other end of the second capacitor C2, the gate end of the second transistor M2 is coupled to the control end of the N type transistor of the eighth transmission gate TG8 to receive the first clock signal CLK1, and the source end of the second transistor M2 is grounded (i.e. coupled to the second power line 4).

As an example and not by way of limitation, the first clock signal CLK1 is generated by inverting the second clock signal CLK2, that is, the phase difference between the first clock signal CLK1 and the second clock signal CLK2 is 180 degrees. When the first clock signal CLK1 is low, and the second clock signal CLK2 is high, the first transmission gate TG1, the fourth transmission gate TG4, the fifth transmission gate TG5, the eighth transmission gate TG8 and the first transistor M1 are enabled, and meanwhile the second transmission gate TG2, the third transmission gate TG3, the sixth transmission gate TG6, the seventh transmission gate TG7 and the second transistor M2 are disabled. Because of the disabled seventh transmission gate TG7 and the enabled first transistor M1, the first capacitor C1 is substantially grounded, where the first capacitor C1 can be charged with the load voltage V_load through the enabled first transmission gate TG1 and supply the stored energy of the load voltage V_load to the inverting input end of the first amplifier 100 through the enabled first transmission gate TG1 and the enabled fifth transmission gate TG5. Thus, the first amplifier 100 can amplify the difference between the load voltage V_load and the reference voltage V_ref, so as to generate the first comparison signal. Then, the detection module 102 can store the energy of the first comparison signal outputted by the first amplifier 100, in the second capacitor C2 through the enabled eighth transmission gate TG8.

When the first clock signal CLK1 is high and the second clock signal CLK2 is low, the first transmission gate TG1, the fourth transmission gate TG4, the fifth transmission gate TG5, the eighth transmission gate TG8 and the first transistor M1 are disabled and meanwhile the second transmission gate TG2, the third transmission gate TG3, the sixth transmission gate TG6, the seventh transmission gate TG7 and the second transistor M2 are enabled. Because of the disabled eighth transmission gate TG8 and the enabled second transistor M2, the second capacitor C2 is substantially grounded. Herein, the energy of the first comparison signal stored in the second capacitor C1 can be pulled up to the energy of the load voltage V_load through the enabled third transmission gate TG3, and the load voltage V_load can continuously be supplied to the inverting input end of the first amplifier 100 through the enabled third transmission gate TG3 and the enabled sixth transmission gate TG6. Thus, the first amplifier 100 can continuously generate the first comparison signal.

Subsequently, the detection module 102, through the enabled seventh transmission gate TG7, stores the energy of the first comparison signal in the first capacitor C2 in which the energy of the load voltage V_load has been stored, so as to pull the voltage on the node n2 up to the combination of the load voltage V_load and the voltage of the first comparison signal (i.e. the compensation voltage) and then supply the combination of the load voltage V_load and the compensation voltage to the function circuit 2 through the enabled second transmission gate TG2. The combination of the load voltage V_load and the compensation voltage is the so-called compensated load voltage V_out.

Accordingly, the voltage compensation circuit 1 in FIG. 3, according to the first clock signal CLK1 and the second clock signal CLK2, can simultaneously enable the first transmission gate TG1 and the fourth transmission gate TG4 and disable the second transmission gate TG2 and the third transmission gate TG3. Alternately, the voltage compensation circuit 1 in FIG. 3, according to the first clock signal CLK1 and the second clock signal CLK2, can simultaneously disable the first transmission gate TG1 and the fourth transmission gate TG4 and enable the second transmission gate TG2 and the third transmission gate TG3. Then, the first capacitor C1 and the second capacitor C2 can alternately supply the compensation voltage through the output end of the second transmission gate TG2 or the output end of the fourth transmission gate TG4. In other words, the voltage compensation circuit 1 alternately uses the energy stored in the first capacitor C1 or the energy stored in the second capacitor C2 to be the temporary compensation, that is, when the first capacitor C1 powers the function circuit 2, the second capacitor C2 will be charged, vice versa.

Figure 4:
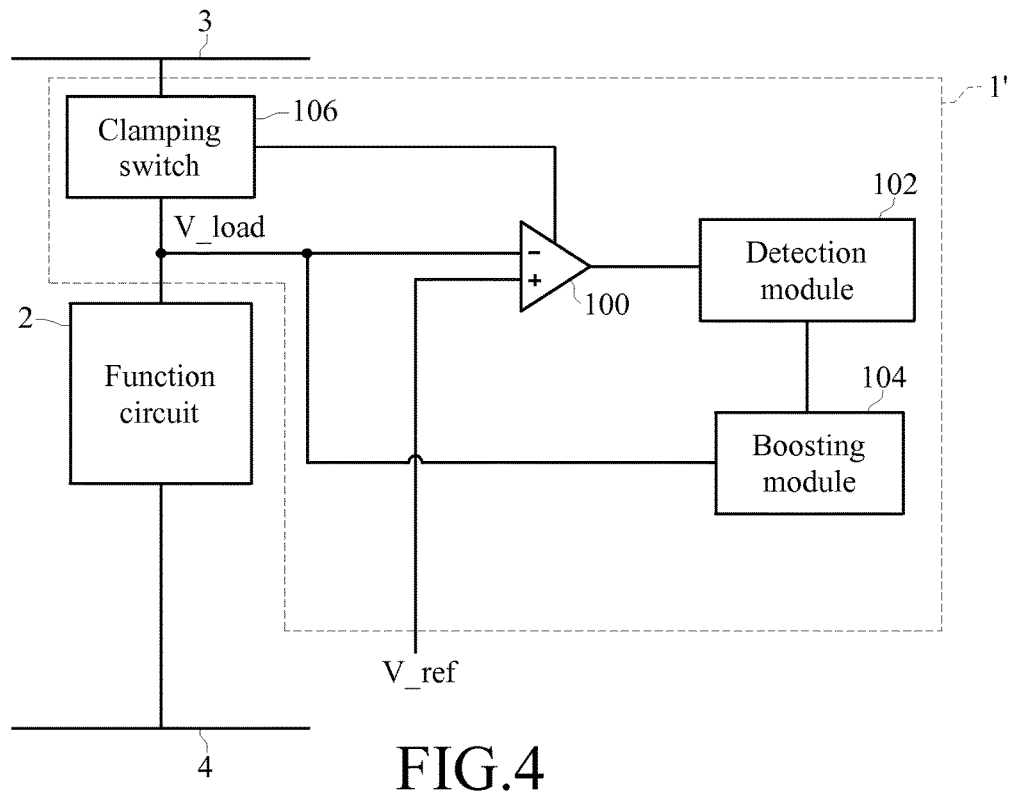
FIG. 4 is a block diagram of a voltage compensation circuit according to an embodiment of the disclosure.

FIG. 4 is a block diagram of a voltage compensation circuit 1' according to an embodiment of the disclosure. The voltage compensation circuit 1' mainly includes a first amplifier 100, a detection module 102, a boosting module 104 and a clamping switch 106. The elements and their operation in the voltage compensation circuit 1' are the same as those in the voltage compensation circuit 1 and thus not described again hereinafter.

Compared with the voltage compensation circuit 1, the voltage compensation circuit 1' further includes a clamping switch 106 for disabling the first amplifier 100 when the function circuit 2 stops operating, thereby reducing unnecessary power consumption and saving power. The input end and output end of the clamping switch 106 are respectively coupled to the first power line 3 and the function circuit 2, and the control end of the clamping switch 106 is coupled to the negative power end of the first amplifier 100. As an example and not by way of limitation, the clamping switch 106 can be a metal oxide semiconductor field effect transistor (MOSFET) whose source end is coupled to the first power line 3, whose drain end is coupled to the inverting input end of the first amplifier 100 and the function circuit 2, and whose gate end is coupled to the negative power end of the first amplifier 100 and receives an external control signal.

Figure 5:
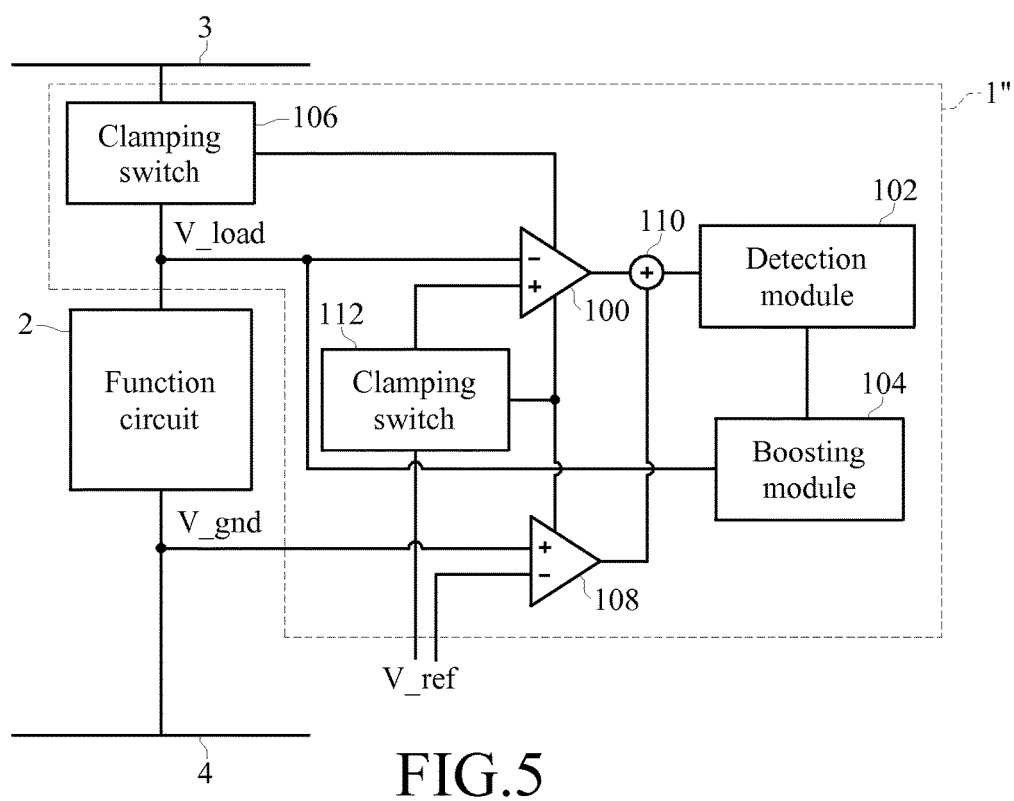
FIG. 5 is a block diagram of a voltage compensation circuit according to an embodiment of the disclosure.

FIG. 5 is a block diagram of a voltage compensation circuit 1" according to an embodiment of the disclosure. The voltage compensation circuit 1" mainly includes a first amplifier 100, a detection module 102, a boosting module 104, a clamping switch 106 (i.e. the first clamping switch), a second amplifier 108, an adder 110 and a clamping switch 112 (i.e. the second clamping switch). The elements and their operation in the voltage compensation circuit 1" are the same as those in the voltage compensation circuit 1' and thus not described again hereinafter.

Compared with the voltage compensation circuit 1', the voltage compensation circuit 1" further includes a second amplifier 108, an adder 110 and a clamping switch 112. The non-inverting input end of the second amplifier 108 is coupled to the function circuit 2 and the second power line 4 to be supplied with a ground voltage V_gnd, the inverting input end of the second amplifier 108 is supplied with a reference voltage V_ref, and the positive power end of the second amplifier 108 is coupled to the positive power end of the first amplifier 100. The second amplifier 108 compares the voltage, i.e. the ground voltage V_gnd, on the second power line 4 with the reference voltage V_ref to generate a second comparison signal.

The adder 110 is coupled to the output end of the first amplifier 100, the output end of the second amplifier 108 and the detection module 102, and performs either addition or subtraction on the first comparison signal outputted by the first amplifier 100 and the second comparison signal outputted by the second amplifier 108, so as to generate compensation voltage information. This can protect the chip from the voltage drop and the voltage ground bounce of transistors switching when the first power line 3 powers the function circuit 2.

The input end and output end of the clamping switch 112 are respectively coupled to the loop (i.e. the power tree in FIG. 2A) supplying the reference voltage V_ref and the non-inverting input end of the first amplifier 100, and the control end of the clamping switch 112 is coupled to the positive power end of the first amplifier 100 and the positive power end of the second amplifier 108. When the first amplifier 100 is disabled, the clamping switch 112 cuts off the connection between the input end and output end of the clamping switch 112, so as to interrupt the supplying of the reference voltage V_ref to the first amplifier 100. As an example and not by way of limitation, the clamping switch 112 can be a MOSFET whose source end is coupled to the non-inverting input end of the first amplifier 100, whose drain end is coupled to the loop (i.e. the power tree in FIG. 2A) supplying the reference voltage V_ref, and whose gate end is coupled to the positive power end of the first amplifier 100 and the positive power end of the second amplifier 108.

Figure 6:
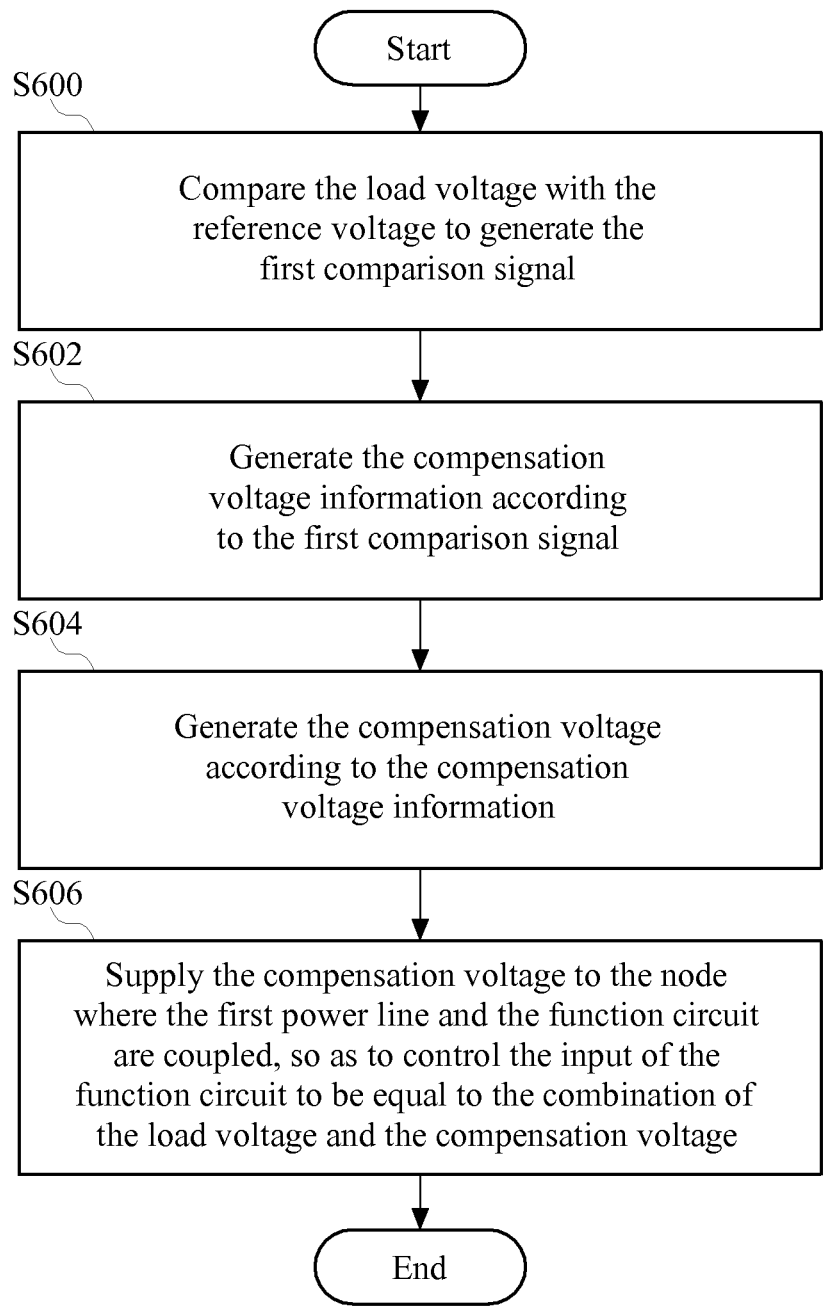
FIG. 6 is a flowchart of a control method of a voltage compensation circuit according to an embodiment of the disclosure.

In view of the above embodiments of the disclosure, the operation of the voltage compensation circuit can be summarized as follows. Take the voltage compensation circuit 1 in FIG. 1 as an exemplary embodiment. FIG. 6 is a flowchart of a control method of the voltage compensation circuit 1 in FIG. 1 according to an embodiment of the disclosure. The control method of the voltage compensation circuit 1 is adapted to dynamically compensate the voltage drop caused by supplying power from the first power line 3 to the function circuit 2. The function circuit 2 is coupled between the first power line 3 and the second power line 4, and the voltage compensation circuit 1 is coupled to a node where the first power line 3 and the function circuit 2 are coupled.

The control method includes the following steps. Firstly, the first amplifier 100 compares the load voltage V_load with the reference voltage V_ref to generate the first comparison signal (step S600). Subsequently, the detection module 102 generates the compensation voltage information according to the first comparison signal (step S602), and the boosting module 104 generates the compensation voltage according to the compensation voltage information (step S604). Finally, the boosting module 104 supplies the compensation voltage to the node where the first power line 3 and the function circuit 2 are coupled, so as to control the input of the function circuit 2 to be equal to the combination of the load voltage V_load and the compensation voltage (step S606). The load voltage V_load is what the first power line 3 attempts to power the function circuit 2.

In an embodiment of the step S600, the first amplifier 100 amplifies the difference between the load voltage V_load and the reference voltage V_ref. In an embodiment, if the function circuit 2 stops operating, the voltage compensation circuit 1 will be disabled.

In an embodiment of the step S602, the detection module 102 further compares the voltage on the second power line 4 with the reference voltage V_ref to generate the second comparison signal, and then the voltage compensation circuit 1 performs either addition or subtraction on the first comparison signal and the second comparison signal via the adder 110 in FIG. 5 to generate the compensation voltage information for the step S604.

As set forth above, in order to dynamically compensate the voltage drop caused by supplying power from the first power line to the function circuit, the voltage compensation circuit in the disclosure can know the attenuation quantity of voltage drop, which is caused by supplying power from the first power line to the function circuit, and obtain corresponding compensation voltage information via the first amplifier and the detection module, and can then generate the compensation voltage according to the obtained compensation voltage information via the boosting module, so as to restore the input of the function circuit to be at the preset voltage potential. Moreover, the first amplifier can obtain the required reference voltage by using the power tree in which the voltage is constant anywhere. Therefore, the disclosure may efficiently compensate more than 60 percent of voltage loss and reduce the design margin for the function circuit.

What is claimed is:

1. A voltage compensation circuit for dynamically compensating a voltage drop caused by supplying power from a first power line to a function circuit coupled between the first power line and a second power line, comprising:
   a first amplifier having an inverting input end coupled to the first power line and the function circuit to be supplied with a load voltage supplied to the function circuit, a non-inverting input end of which is supplied with a reference voltage, and an output end of which for outputting a first comparison signal generated by comparing the load voltage with the reference voltage;
   a detection module coupled to the output end of the first amplifier, for generating compensation voltage information according to the first comparison signal; and
   a boosting module coupled between the detection module and the inverting input end of the first amplifier, for generating a compensation voltage according to the compensation voltage information and supplying the compensation voltage to the inverting input end of the first amplifier, where an input voltage of the function circuit is equal to a combination of the load voltage and the compensation voltage.

2. The voltage compensation circuit according to claim 1, wherein the first amplifier is an error amplifier for amplifying a difference between the load voltage and the reference voltage to generate the first comparison signal.

3. The voltage compensation circuit according to claim 1, wherein the voltage compensation circuit further comprises a clamping switch having an input end and output end through which the clamping switch is coupled between the first power line and the function circuit, and having a control end coupled to a negative power end of the first amplifier, and the clamping switch is configured to disable the first amplifier when the function circuit stops operating.

4. The voltage compensation circuit according to claim 1, wherein the voltage compensation circuit further comprises:
   a second amplifier having a non-inverting input end coupled to the function circuit and the second power line, an inverting input end for being supplied with the reference voltage, and an output end for outputting a second comparison signal generated by comparing a voltage on the second power line with the reference voltage; and
   an adder coupled to the output end of the first amplifier, the output end of the second amplifier and the detection module, for performing either addition or subtraction on the first comparison signal and the second comparison signal to generate the compensation voltage information.

5. The voltage compensation circuit according to claim 4, wherein a positive power end of the first amplifier couples to a positive power end of the second amplifier, and the voltage compensation circuit further comprises:
   a first clamping switch having an input end and output end via which the first clamping switch is coupled between the first power line and the function circuit, and a control end which is coupled to a negative power end of the first amplifier, so as to disable the first amplifier when the function circuit stops operating; and
   a second clamping switch having an input end and output end via which the second clamping switch is coupled to the non-inverting input end of the first amplifier and a loop supplying the reference voltage, and a control end which is coupled to the positive power end of the first amplifier and the positive power end of the second amplifier, wherein the output of the second clamping switch is blocked when the first amplifier is disabled.

6. The voltage compensation circuit according to claim 1, wherein the voltage compensation circuit is applicable to a chip comprising the function circuit and a plurality of first conductive wires, four of the first conductive wires form a power ring, the other first conductive wires are paralleled and coupled to two opposite first conductive wires of the power ring in parallel, and the first power line is one of the other first conductive wires.

7. The voltage compensation circuit according to claim 6, wherein the chip further comprises a plurality of second conductive wires, two of the second conductive wires couple to the power ring and are crisscross at the center of the power ring, the other second conductive wires symmetrically couple to the other first conductive wires in the power ring around the center of the power ring, and a voltage on each of the second conductive wires is substantially equal to a voltage on the power ring and serves as the reference voltage.

8. The voltage compensation circuit according to claim 1, wherein the boosting module comprises:
   a first transmission gate having an input end for being supplied with the load voltage, and comprising a N type transistor having a control end for receiving a first clock signal, and a P type transistor having a control end for receiving a second clock signal;
   a second transmission gate having an input end coupled to an output end of the first transmission gate, and comprising a N type transistor having a control end for receiving the second clock signal, and a P type transistor having a control end for receiving the first clock signal;
   a first capacitor having one end coupled to the detection module, and the other end coupled to the output end of the first transmission gate and the input end of the second transmission gate;

a third transmission gate having an input end for being supplied with the load voltage, and comprising a N type transistor having a control end for receiving the second clock signal, and a P type transistor having a control end for receiving the first clock signal;

a fourth transmission gate, having an input end which is coupled to an output end of the third transmission gate, and comprising a N type transistor having a control end for receiving the first clock signal, and a P type transistor having a control end for receiving the second clock signal; and a second capacitor having one end coupled to the detection module, and the other end coupled to the output end of the third transmission gate and the input end of the fourth transmission gate;

wherein the first clock signal is generated by inverting the second clock signal, and the boosting module, according to the first clock signal and the second clock signal, either enables the first transmission gate and the fourth transmission gate and disables the second transmission gate and the third transmission gate, or disables the first transmission gate and the fourth transmission gate and enables the second transmission gate and the third transmission gate, so as to provide the compensation voltage via the first capacitor and the second capacitor alternately and output the compensation voltage via the output end of the second transmission gate or the output end of the fourth transmission gate.

9. The voltage compensation circuit according to claim 8, wherein the boosting module further comprises:

a fifth transmission gate having an input end coupled to the output end of the first transmission gate, the input end of the second transmission gate and the first capacitor and an output end coupled to the inverting input end of the first amplifier, and comprising a N type transistor having a control end for receiving the second clock signal, and a P type transistor having a control end for receiving the first clock signal; and a sixth transmission gate having an input end coupled to the output end of the third transmission gate, the input end of the fourth transmission gate and the second capacitor and an output end coupled to the inverting input end of the first amplifier, and comprising a N type transistor having a control end for receiving the first clock signal, and a P type transistor having a control end for receiving the second clock signal.

10. The voltage compensation circuit according to claim 8, wherein the detection module comprises:

a seventh transmission gate having an input end coupled to the output end of the first amplifier, and an output end coupled to the first capacitor, and comprising a N type transistor having a control end for receiving the second clock signal, and a P type transistor having a control end for receiving the first clock signal;

a first transistor having a drain end coupled to the output end of the seventh transmission gate and the first capacitor, a gate end coupled to the control end of the N type transistor of the seventh transmission gate to receive the second clock signal, and a source end coupled to the second power line;

an eighth transmission gate having an input end coupled to the output end of the first amplifier, and an output end coupled to the second capacitor, and comprising a N type transistor having a control end for receiving the first clock signal, and a P type transistor having a control end for receiving the second clock signal; and a second transistor having a drain end coupled to the output end of the eighth transmission gate and the second capacitor, a gate end coupled to the control end of the N type transistor of the eighth transmission gate for receiving the first clock signal, and a source end coupled to the second power line.

11. A control method of a voltage compensation circuit coupled to a node where a first power line and a function circuit join, for dynamically compensating a voltage drop caused by supplying power from the first power line to the function circuit coupled between the first power line and a second power line, and the control method comprising steps of:

comparing a load voltage with a reference voltage to generate a first comparison signal;

generating compensation voltage information according to the first comparison signal;

generating a compensation voltage according to the compensation voltage information; and supplying the compensation voltage to the node, so as to control the input of the function circuit to be equal to a combination of the load voltage and the compensation voltage;

wherein the load voltage is supplied from the first power line to the function circuit.

12. The control method according to claim 11, wherein the step of comparing the load voltage with the reference voltage comprises to amplify a difference between the load voltage and the reference voltage.

13. The control method according to claim 11, wherein the voltage compensation circuit is disabled when the function circuit stops operating.

14. The control method according to claim 11, wherein the step of generating the compensation voltage information according to the first comparison signal comprises:

comparing the voltage on the second power line with the reference voltage to generate a second comparison signal; and performing either addition or subtraction on the first comparison signal and the second comparison signal to generate the compensation voltage information.

15. The control method according to claim 11, wherein the voltage compensation circuit is applicable to a chip comprising the function circuit and a plurality of first conductive wires, four of the first conductive wires form a power ring, the other first conductive wires are paralleled and coupled to two opposite first conductive wires of the power ring in parallel, and the first power line is one of the other first conductive wires.

16. The control method according to claim 15, wherein the chip further comprises a plurality of second conductive wires, two of the second conductive wires couple to the power ring and are crisscross at the center of the power ring, the other second conductive wires symmetrically couple to the other first conductive wires in the power ring around the center of the power ring, and a voltage on each of the second conductive wires is substantially a voltage on the power ring and serves as the reference voltage.

* * * * *